US008174710B2

(12) United States Patent
Nagarajan et al.

(10) Patent No.: US 8,174,710 B2
(45) Date of Patent: May 8, 2012

(54) SYSTEM AND METHOD FOR DIAGNOSING A FAILURE CONDITION IN AN IMAGE PATH OF AN IMAGE PROCESSING APPARATUS

(75) Inventors: Ramesh Nagarajan, Pittsford, NY (US); Clara Cuciurean-Zapan, Fairport, NY (US); William Yeoh, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 856 days.

(21) Appl. No.: 12/263,715

(22) Filed: Nov. 3, 2008

(65) Prior Publication Data

US 2010/0110468 A1 May 6, 2010

(51) Int. Cl.
*G06K 15/00* (2006.01)

(52) U.S. Cl. ....................................... 358/1.14; 358/406

(58) Field of Classification Search ................. 358/1.14, 358/406, 504; 399/8, 9, 10, 11, 12, 18, 19
See application file for complete search history.

(56) References Cited

U.S. PATENT DOCUMENTS

| | | | | |
|---|---|---|---|---|
| 4,133,477 | A | 1/1979 | Marino et al. | |
| 5,111,457 | A | 5/1992 | Rabjohns et al. | |
| 7,606,237 | B2 * | 10/2009 | Dziong et al. | 370/395.41 |

* cited by examiner

*Primary Examiner* — Cheukfan Lee

(74) *Attorney, Agent, or Firm* — Pillsbury Winthrop Shaw Pittman LLP

(57) ABSTRACT

Disclosed herein is a system and method for diagnosing a failure condition of an image processing apparatus. When a failure condition is detected in an image path during output of a document, a fault code is issued. The image processing apparatus is then capable of performing an internal diagnosis to generate a diagnostic report, and send the diagnostic report and fault code to an operator at a remote location. The system and method allows one to diagnose a problem or failure condition more quickly and efficiently, thereby cutting down on service time and costs.

14 Claims, 5 Drawing Sheets

SYSTEM AND METHOD FOR DIAGNOSING A FAILURE CONDITION IN AN IMAGE PATH OF AN IMAGE PROCESSING APPARATUS

BACKGROUND

1. Field

The present disclosure is generally related to diagnosing a failure condition of an image processing apparatus, and, in particular, to a system and method for remotely diagnosing a failure condition in an image path of an image processing apparatus.

2. Description of Related Art

Output devices, such as multi-function printers or devices (MFDs), are becoming quite complex and deal with sophisticated concurrent operations. During use, such as when outputting image data via a print job or copy job, such a device may encounter problems when outputting a page or document. When a device fails in the field, i.e., at a customer site or location, it is can be hard to diagnose a problem by observing at the fault codes issued by the device which may be associated with the problem. Typically, fault codes indicate where a problem was first identified, but do not necessarily indicate the chain of events or job activities that may have lead to the failure or problem. Currently, for problems that cannot be easily diagnosed using fault codes, a Customer Service Engineer (CSE) is sent to the customer site to fix the problem. The CSE may then through a series of diagnostic patterns using the devices of the MFD (e.g., the scanner, controller, or marking engine) to hopefully isolate the problem in the associated area of the image path. Depending on the problem, this method could require an significant amount of time (e.g., two to eight hours) to isolate and fix the issue. This not only costs a lot of money and time for a service provider or supplier to spend on servicing their products, but may cost the customer time and money, thus resulting in an unsatisfactory experience for the customer.

Generally, having a CSE shut down a device for extended period of time makes the machine unusable for any other purpose, which can also upset a customer. For example, if a printing related problem is diagnosed, a device could be used for scanning. However, for current methods, while a machine is waiting to be serviced and during such servicing, none of its functions are typically enabled, and then no operation can be performed on the device during the duration of the problem.

SUMMARY

One aspect of the disclosure provides a method for diagnosing a failure condition of an image processing apparatus, the image processing apparatus including an image input terminal for inputting documents into image data and an image output terminal for outputting documents. The method includes: receiving an output job having image data of a document to output using the image processing apparatus; detecting a failure condition in at least one of a plurality of image paths of the image processing apparatus; and issuing a fault code based on the detected failure condition. The method also includes retrieving information related to previous output jobs output by the image processing apparatus. The retrieved information identifies at least a number of image paths to be tested and settings associated with each previous output job. The method also performs a plurality of tests on the identified number of image paths of the image processing apparatus using the retrieved information. The plurality of tests includes: comparing, for each identified image path, a benchmark outcome of image data processed therein to an actual outcome for the received image data processed therein, and determining at least one image path of the identified number of image paths having a discrepancy as a result of the comparing of the benchmark and actual outcomes. The method then generates a diagnostic report based upon the at least one determined image path. In some embodiments, the method also includes sending at least the generated diagnostic report and issued fault code to an operator at a remote location.

Another aspect of the disclosure provides an image processing apparatus having an input device for inputting image data of a document to be output; an output device for outputting the image data; and a plurality of image processing elements for processing the image data, each of the image processing elements having an input and an output. The apparatus also has a router configured to route the image data among the plurality of image processing elements via an image path selected from a plurality of image paths. Each image path is a series of connections between the inputs and outputs of the processing elements. Also provided in the apparatus is a controller for detecting a failure condition in at least one of the plurality of image paths and outputting a fault code based on the detected failure condition. The controller is configured to retrieve information related to previous output jobs output by the image processing apparatus, and the retrieved information identifies at least a number of image paths to be tested and settings associated with each previous output job. The controller is configured to perform a plurality of tests on the identified number of image paths of the image processing apparatus. The controller has a comparison tool configured to perform the plurality of tests, and the plurality of tests at least identify a discrepancy in an image path determined by comparing a benchmark outcome of image data input into each image path with an actual outcome of the image data input into each image path. The controller is also configured to generate a diagnostic report based upon the results of the plurality of tests. In some embodiments, the controller may be used to send at least the generated diagnostic report and issued fault code to an operator at a remote location.

Yet another aspect of the disclosure provides a computer readable medium having stored computer executable instructions. The computer executable instructions, when executed by a computer, direct a computer to perform a method for diagnosing a failure condition of an image processing apparatus. The method includes: receiving an output job having image data of a document to output using the image processing apparatus; detecting a failure condition in at least one of a plurality of image paths of the image processing apparatus; and issuing a fault code based on the detected failure condition. The method also includes performing a plurality of tests on the plurality of image paths of the image processing apparatus. The plurality of tests includes: comparing, for each image path, a benchmark outcome of image data processed therein to an actual outcome for the received image data processed therein, and identifying at least one image path of the plurality of image paths having a discrepancy as a result of the comparing of the benchmark and actual outcomes. The method also generates a diagnostic report based upon the results of the plurality of tests. In some embodiments, the method also includes sending at least the generated diagnostic report and issued fault code to an operator at a remote location.

Other features, and advantages of the present disclosure will become apparent from the following detailed description, the accompanying drawings, and the appended claims.

DETAILED DESCRIPTION

Generally, the following disclosure proposes a set of automatic self diagnostic routines or tests for the image path to perform at least a first level of diagnosis for a failure condition or problem associated with outputting image data when using an image processing apparatus. Such a self diagnostic method is run by the apparatus (MFD) itself at the time of detecting a failure condition, and when a fault code indicates a need for service. The results are then passed on to service personnel/CSE which assists in resolving problems more quickly should the CSE have the need to go to the customer site. This disclosure generally describes an approach for isolating a root cause of a failure condition and providing more detailed fault codes and conditions to help assist the CSE to fix a problem with a device more quickly.

Figure 1:
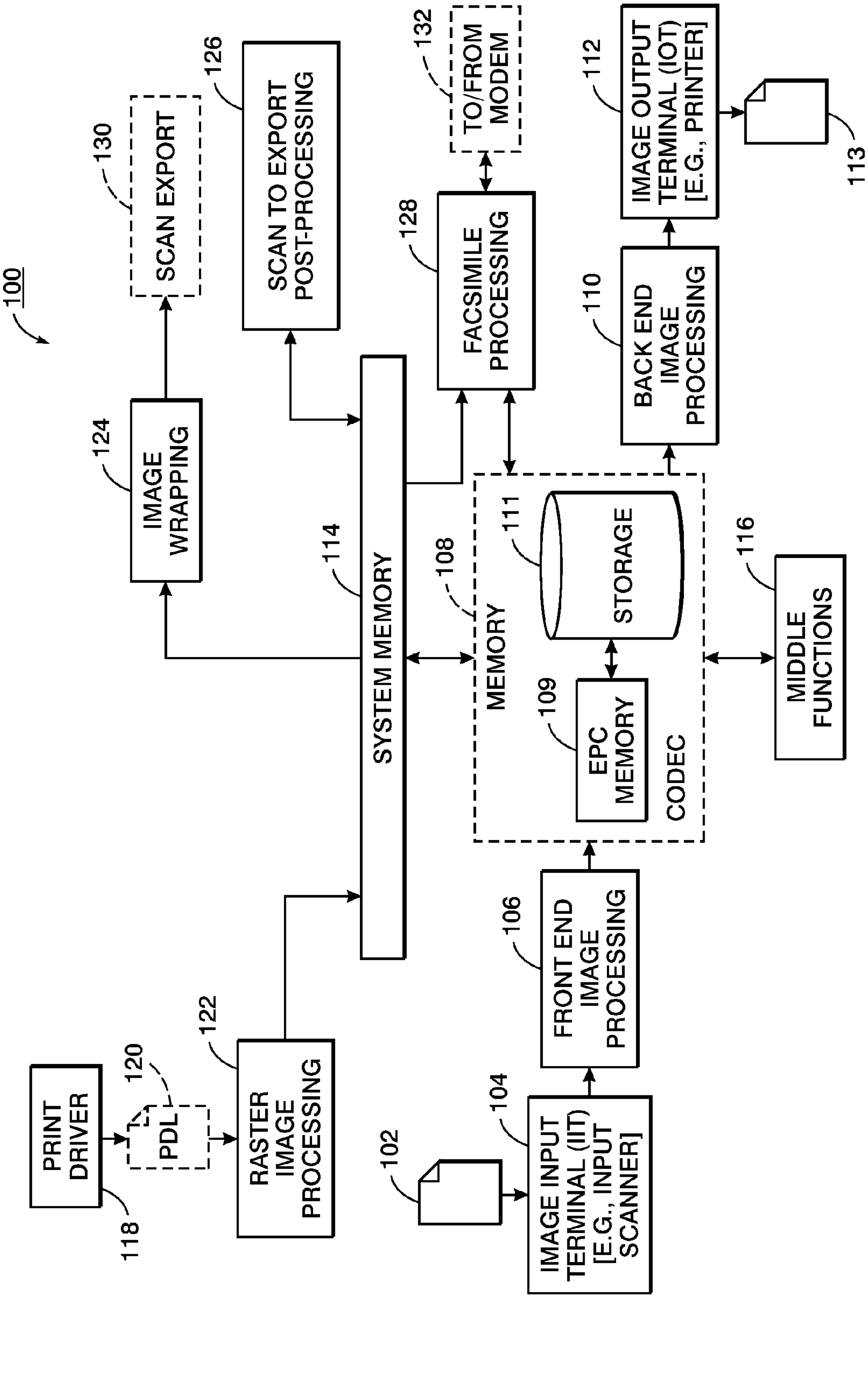
FIG. 1 illustrates an example of a block diagram of a multifunction image path used to handle concurrent operations for an image processing apparatus in accordance with an embodiment of the present disclosure.

Referring now more particularly to the drawings, FIG. 1 illustrates an example of a block diagram of a multifunction image path 100 used to handle concurrent operations for an image processing apparatus. More specifically, image path 100 shown in FIG. 1 is representative of one or more paths through which image data of an input document 102 or page, input into an image processing apparatus, may be processed using a plurality of processing elements and then output. An example of such an apparatus may be an MFD, for example. The image path of the image processing apparatus or device comprises, among other devices, an image input terminal (IIT) 104, a processor or processing elements 106 and 110, a memory 109 and/or a storage device 111, and an image output terminal (IOT) 112 and/or marking engine interface. Generally, the above elements (as will be described) of the device are provided to perform functions that assist in receiving image data such as a scanned document, configuring the image path of the processing elements 106 and 110 to process the image data, and outputting the image data. The image processing apparatus comprises a plurality of image paths for manipulating image data of a document for output. One example includes printing a document using a print driver 118 according to a selected output mode of the image processing apparatus. However, it should be noted that the apparatus or device may comprise additional elements not described herein or alternative elements for performing similar functions, and should not be limited to those elements as illustrated in FIG. 1. Generally, the image paths shown in FIG. 1 corresponds to any number of output modes that may be selected for an image processing apparatus. Further, additional elements, such as source and sink locations 310 and 312 described with reference to FIG. 3, may be included or excluded from the multifunction image path 100.

Figure 5:
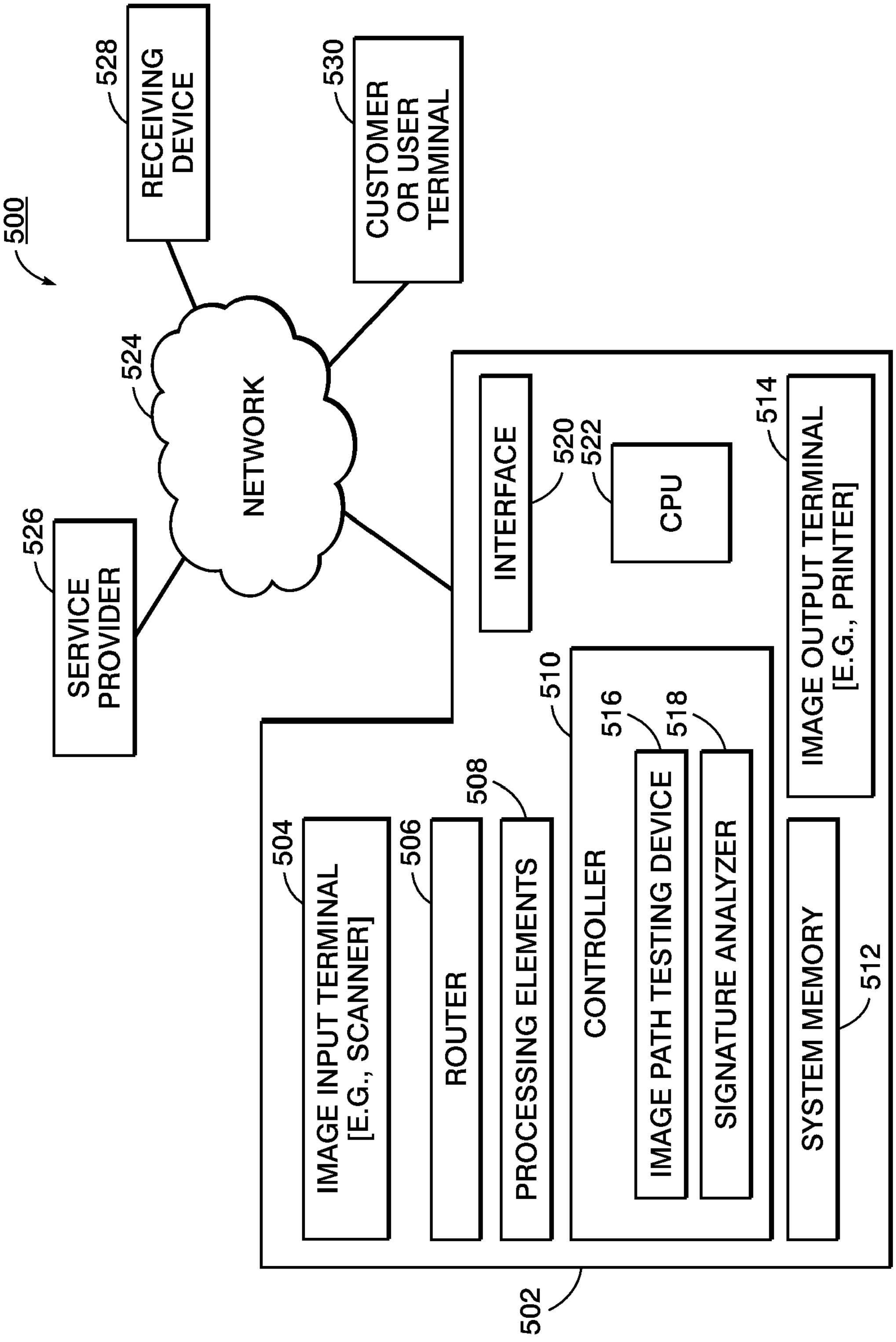
FIG. 5 illustrates an example of a system for implementing the method of FIG. 2.

The IIT 104 is used to scan or acquire an input document or page into image data to be processed along the multifunction image path 100. For example, a path which uses image data input via a scanner is referred to herein as a scanner image path. The IIT 104 may be a digital scanner, for example. The scanner may capture image data as binary or contone image data, for example. Generally, however, any device used to scan or capture the image data of a document is regarded and will be referred to as an IIT. For example, the image data may be captured by a scanner in a copier, a facsimile machine, a multi-function device, a camera, a video camera, or any other known or later device that is capable of scanning a document and capturing electronic image data. In some embodiments, IIT 104 may be connected to a network or telephone system, for example, to receive as input image data such as via a facsimile (fax) machine or computer (CPU). Alternatively, for example, image data may be directly input into an image path via a fax processing element 128 or module, also referred to herein as a fax image path. Input documents and/or image data may be received via a telephone number, an e-mail address, an Internet Protocol (IP) address, a server, or other methods for sending and/or receiving electronic image data. FIG. 5 also discusses further details with regard to the image processing apparatus and system.

A processor or processing elements 106, 116 and 110 for processing and/or manipulating image data using a plurality of operations and/or processes are also provided in the image paths. The description of the processing elements below are an example of devices capable of implementing processes to be performed and should not be limiting. For example, additional processing elements may be provided along one or more image paths 100. Alternatively, additional operations may be performed on the image data other than or in addition to those described with reference to FIGS. 1 and 3.

The multifunction image path 100 may comprise a plurality of image processing elements (or processor) and for manipulating image data received from the IIT 104 or other input devices using a plurality of operations and/or processes. The processing elements and may be a combination of image processing elements which comprise software and hardware elements that perform a number of operations on the image data received from the IIT 104 (or other source) using a set of parameters. The parameters are used to convert the images to the format desired as output (e.g., high quality) along the image path. The processing elements may be a part of a computer system or apparatus such as a xerographic system, a photocopier, a printing device, or MFD. For simplicity purposes, the term "processing element" throughout the application will refer to one or more elements capable of executing machine executable program instructions. It is to be understood that any number of processing elements may be used and that additional operations or processes besides those described below may be provided in an image path.

More specifically, the multifunction image path 100 comprises a front end processing element 106, a memory 109, storage 111, and a back end processing element 106. The front end processing element 106 is an image processing element that receives image data from the IIT 104 and is used to process the image data according to user preferences such that it may be stored and later retrieved for output. The back end processing element 110 is generally used at the end of an image path to retrieve stored image data (e.g., from memory 109) and to process the image data such that the image data may be output to a printing device as an accurate recreation of the original input or scanned image. Of course, processing elements may also be used for compression and/or decompression of image data.

Each of the image processing elements comprises an input and an output. Additionally, the system or apparatus may also include one or more controllers or routers (not shown) to select and route the image data between the processing elements 106 and 110 and memory 109 and/or storage 111, for example.

Front end processing element 106 receives as input the image data from the IIT 104 via a scanning engine interface, for example, and processes the image data along the scan image path. Front end processing element 106 may be used to process the scanned image data as well as determine user-defined operations generally known in the art. For example, the front end processing element 106 may be used for color space conversion, reduction or enlargement, document registration, and/or performing other operations or processes on the image data, for example.

Memory 109 and/or storage 111 may be used to store image data. For example, memory 109 and/or storage 111 may be used to temporarily store the original image data of document input via IIT 104. Converted (e.g., contone to binary image data) or compressed image data may also be stored in the memory 109 and/or storage 111. Memory 109 and/or storage 111 may be used to store machine readable instructions to be executed by the processor/processing elements. The memory 109 and/or storage 111 may be implemented using static or dynamic RAM (random access memory), a floppy disk and disk drive, a writable optical disk and disk drive, a hard disk and disk drive, flash memory, or the like, and may be distributed among separate memory components. The memory 109 and/or storage 111 can also include read only memory, or other removable storage drive(s) or memory devices.

In some embodiments, the memory device may comprise an EPC (Electronic Precollation) memory 109; however, other memory and/or storage devices are considered within the scope of this disclosure and may be used. EPC Memory 109 is a dedicated memory or storage device used for storing intermediate images. Generally, EPC Memory 109 is a location for temporarily storing processed and/or formatted image data in the image path. That is, EPC Memory 109 may store image data that is going to be eventually output (e.g., via MFP of scan image path or a fax device of fax image path 130). Storage 111 generally provides additionally storage capacity for image data.

System memory 114 may also be considered a main memory of the image processing apparatus. System memory 114 is used to run software associated with a controller, for example. System memory 114 may comprise, for example, a hard disk and drive which includes programs, image data, and the like that may be used for processing, etc. In some embodiments, system memory 114, memory 109, and/or storage 111 may be interchangeable or provided as a single device.

Generally, also associated with memory 109 and storage 111 is a device or program that is capable of encoding and decoding image data. For example, the image data may be processing by a plurality of coder-decoder pairs, i.e., CODEC, 108, which is generally known in the art. Codec 108 may provided to perform any number of compression/decompression techniques on the image data including, but not limited to JPEG or JBIG2. A compressor and decompressor or other devices of the apparatus may use compression/decompression algorithms or other encoding/decoding methods, and should not be limiting.

The front end processing element 106 may communicate with memory 109 and/or storage 111 to store processed and/or compressed image data, for example. Compressed image data may be stored in memory 109 and/or storage 111 temporarily or for a later time when needed. When the image data is needed or it is time for marking (e.g., using the marking engine interface/IOT 112 or printing device), the image data may be retrieved from memory 109 and/or storage 111 via the back end processing element 110 to be exported, for example.

In some embodiments, the multifunction image path 100 may also include a middle functions processing element 116 which may be used to perform some additional image data manipulation. Middle functions element 116 may be used for middle function operations including, but not limited to, rotation, annotation, and merging, and for compressing and/or decompressing image data for output, for example. The middle functions processing element 116 may communicate with memory 109 and/or storage 111 to store processed and/or compressed image data, for example. The input and output of image data to the middle functions processing element 116 depends on the selectively chosen image path or output mode. In some embodiments, middle functions processing element 116 may receive and store image data in PDL format or intermediate image format (IIF). The middle functions element 116 may also process and format image data for exporting out on a network, such as PDF, TIFF, or JPEG file formats, or for a fax device. Nonetheless, the functions performed by middle functions processing element 116 should not be limiting.

Back end processing element 110 receives processed image data retrieved from the memory 109 or storage 111. Back end processing element 110 may be used to further render the image data for output. For example, back end processing element 110 may be used to convert the color space of the processed image data (e.g., convert from device independent color space such as standard RGB (sRGB) or CIE L*a*b color space to device dependent CMYK color space), provide color balance, further rendering, filtering, and/or other operations or processes to prepare the images for marking. Subsequently, the back end processing element 110 may be used to decompress the image data and output the image data to the IOT 112. The output of processed image data from the back end processing element 110 depends on the image path or selected output mode.

In an embodiment, the processed image data may be directly output to the marking engine interface or IOT 112 for printing using a printer/MFD. The IOT 112 or marking engine interface may be associated with a printer or MFD which is used for printing documents. The IOT or marking engine interface is used to output the processing image data to the printer for a copy or print job. The IOT 112 or marking engine interface may further perform image processing on the image data to make corrections or compensate for deviation in the printing process. Alternatively, the back end processing element 110 may be used to perform further image processing on the image data.

The IOT 112 outputs processed image data to the printer or apparatus to complete the scan image path, for example. Of course, the algorithms and processes used by the elements in the image path shown in FIG. 1 should not be limiting. Any number of data compression algorithms (e.g., lossless, lossy), decompression algorithms, color conversion algorithms (e.g., contone to binary, binary to grayscale, XYZ to CIE L*a*b, etc.) and the like may be performed to provide a high quality output document 113.

With regard to a print image path, one possible print operation, as illustrated in FIG. 1, comprises a print driver 118 located on a network, personal computer (PC), or other digital device comprising software. Printer driver 118 produces a PDL (Page Description Language) file 120 for printing or displaying via an IOT 112. The PDL file is processed by a Raster Image Processing element 122 to produce (binary) formatted image data capable of being compressed for storage in the system memory 114 and/or memory 109. Alternatively, as noted above, image data may be directly input and/or output via a fax processing element 128 along a fax image path 132. The fax processing element 128 may perform appropriate processing to the image data received/sent via a modem (not shown) along the fax image path 132. For example, the fax processing element 128 may convert image data acquired or retrieved from system memory 114, memory 109 (or EPC memory), and/or storage 111 into a compatible encoded format, such as CCITT formatted data, to transmit the data via the modem (not shown). Alternatively, the fax processing element 128 may convert data received via a modem into image data to be stored or processed in the image path.

The multifunction image path 100 may also perform an operation of producing a scanned image file for export, as illustrate by scan export path 130. Scanned image data may be retrieved from memory 109 or storage 111 via system memory 114, and then converted to a format appropriate for exporting by an image wrapping element 124 or similar device. Generally algorithms or other processes may be performed by the image wrapping element 124 based upon a selected scan mode, output format, etc.

A scan-to-export post-processing element 126 may also be provided for processing image data for exporting. The post-processing element 126 may process and configure the image data for transmission to a device (e.g., PC, server) or along a network, among other things. For example, post-processing by element 126 may include mixed raster content generation, compression of image data (e.g., algorithms such as JBIG2, JPEG, or JPEG2000), performing optical character recognition (OCR), etc.

As noted, during output jobs such as a copy or print job, image data is employed through the image path 100 of an apparatus. As the frequency or number of times a document, page, or object submitted to the image path increases, the image processing apparatus may encounter failure conditions. A failure condition is hereby defined as a condition wherein a job or function may not be completed or output by the apparatus. For example, a failure condition may be identified when scanned images are corrupted due to a problem with the front end image processing by element 106, or when image data is corrupted while marking due to disk failure in storage 111. Of course, the number and type of failure conditions associated with or diagnosed by the image processing apparatus should not be limiting. Nonetheless, as previously noted, such failure conditions, their diagnosis, and repair may affect the service costs to both customers and service providers.

Therefore, as provided in the method further described below with respect to FIG. 2, automatically performing diagnostic tests on the image paths of the image processing apparatus is beneficial. In this case, "automatically" performing the method refers to collecting information at the time a failure condition is detected. For example, as pages or documents are copied or printed in a MFD, each job follows an image path, depending on its input source. The system performs such a method by testing and analyzing the image paths and the image data being output.

Figure 2:
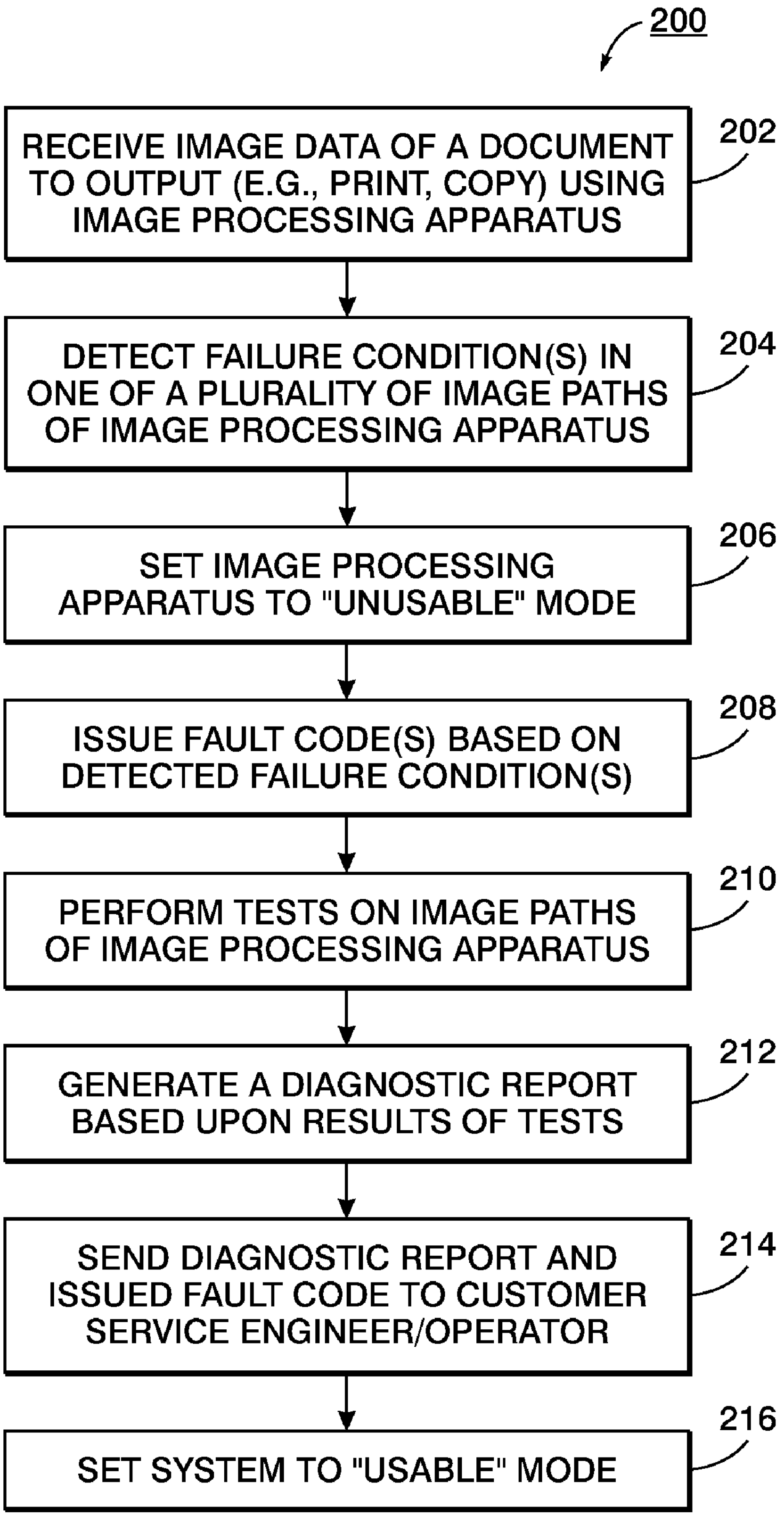
FIG. 2 illustrates a flow chart diagram illustrating a method for diagnosing a failure condition of an image processing apparatus in accordance with an embodiment of the present disclosure.

FIG. 2 illustrates a flow chart diagram illustrating a method 200 for diagnosing a failure condition of an image processing apparatus in accordance with an embodiment of the present disclosure. As shown, at step 202, a job or image data is received for outputting a document using the image processing apparatus. The job may be a print or copy job for producing an output document 113 from an input document 102 of input image data as shown in FIG. 1, for example.

During processing of the image data in an image path, should a failure condition be detected as shown by step 204, the system or apparatus may automatically begin determining the source of the failure condition. It should be noted that a failure condition of an apparatus may be detected in any number of ways, some methods which are known in the prior art, and therefore should not be limiting. For example, U.S. Pat. No. 5,111,457, which is herein incorporated by reference in its entirety, describes a method for verifying the integrity of the non-volatile memory device contents in an image processing apparatus, which may be used to determine or detect a failure condition in an embodiment of this disclosure. Generally, the '457 patent performs a non-volatile memory check and includes the steps of verifying selected patterns and element(s) related to the non-volatile memory and determining a non-volatile memory fault during the process of performing the non-volatile memory check. U.S. Pat. No. 4,133,477, which is also incorporated by reference in its entirety, describes a method and system having fault detection, which also may be used (in accordance with an embodiment of this disclosure) to detect a failure condition. The '477 patent generally describes a system with a fault flag array. Each flag in the array is associated with an operating component or area of a machine such that, upon a fault or malfunction thereof, a fault flag corresponding thereto is set, and a machine fault is declared. The '457 and '477 patents are just some examples of how failure condition could be detected in the apparatus or MFP of the present disclosure, and, again, should not be limiting.

For example, as further described below, the failure condition may be detected by a controller of the system. Then, in step 206, the controller and/or other system device(s) may set the image processing apparatus into an "unusable" mode for at least a period of time. An "unusable" mode may be defined as the inability to input, manipulate, process, and/or output documents using the image processing apparatus. The length of the period of time for the unusable mode may be defined by the length required for the apparatus to perform the internal tests along the image path(s), for example. Thereafter, the controller and/or apparatus may identify and issue a fault code(s), at step 208, based on the detected failure condition (s). The fault code(s) may be based on the detected failure condition and/or other actions associated with the output of the image data. Typically, but not exclusively, the fault code is determined based upon the originally detected failure condition. For example, if IIT 104 is identified as a source of the problem, at least one fault code associated with the identified problem in the IIT (or scanner) may be issued and/or output. In some embodiments, the fault code(s) may be output to a user interface or screen of the image processing apparatus. Generally, such methods of identifying a fault code associated with a failure condition are known in the art, and, therefore, are not discussed in detail herein.

A plurality or series of tests are then performed on the image path(s) of the image processing apparatus in step 210. As will be further described in detail below, the tests may use information from previous jobs as well as include comparing a benchmark result to an actual result in an image path to diagnose the source of the possible failure conditions. After such tests are performed, a diagnostic report based upon the results of the tests is generated at step 212. The report may be generated by a controller or CPU, for example. The generated diagnostic report and the issued fault code may then be sent, in the form of an image data file, for example, to a CSE, operator, personnel, or other user or administrator, as indicated at step 214. The system or apparatus may then be set to a "partially usable" mode at step 216. A "partially usable" mode may be defined as a mode in which a user or customer may perform at least some operations (e.g., scanning, copying, printing) on an image processing apparatus. For example, though a failure condition be identified, a user may still be able to scan documents, for example, if the failure condition is not determined to be along the scan image path. Generally, the customer may use the limited yet available functions of the MFP or image processing apparatus that are not identified as a source of the failure condition until the CSE arrives on site to fix the identified problem(s).

Sending the results in the form of a diagnostic report along with the fault code to the CSE (or operator, etc.) assists the CSE in solving identified problems or issues more quickly when arriving at the customer site or location. Preferably, the report is sent to the CSE at a remote location (i.e., off-site), so the CSE can be apprised of the problem before reporting to the site for repair work. The image data file comprising the information of the report and fault code may be wirelessly transmitted to the CSE, for example, as described with respect to FIG. 5. For example, digital report information may be sent from the apparatus to a receiving device 528 over a network 524. Such devices will be further described with reference to FIG. 5.

As will become further evident, method 200 provides several advantages over the prior art. For example, the method 200 and additional embodiments as will be described are capable of diagnosing such conditions without the use of any paper media. For example, neither scanning of the hardcopy original (e.g., input document 102) nor printing of document would be required to perform the diagnosis or steps herein described.

Also, the method 200 and apparatus described herein do not require or involve human intervention for diagnosis. The cause of the problem/failure condition is self-diagnosed by the apparatus or machine using the above method by running a series of jobs or tests internally, i.e., in the image path, to isolate the source of the failure condition.

Additionally, as noted above, the customer or user may use at least those functions of the MFP or apparatus which are not a source of the failure condition. Also, by receiving the diagnostic report and fault code remotely, i.e., before arriving on site, the CSE has the capability to prepare for and possibly identify the issue(s) or problem(s) in need of correction. In some instances, the CSE may also be able to solve a detected failure or problem remotely without having to visit the site or location of the apparatus. For example, in some embodiments, the service provider may be able to direct the operator or user at the customer's site with instructions for correcting the failure condition. In some embodiments, the service provider may be able to electronically communicate with the image processing apparatus, such as via a network 524 shown in FIG. 5, to correct the detected failure condition. In any case, the downtime for the apparatus as well as the time the CSE spends on diagnosing and correcting problems will significantly decrease, as the length of time of the unusable mode, i.e., time required for internal diagnosis, is decreased.

Figure 4:
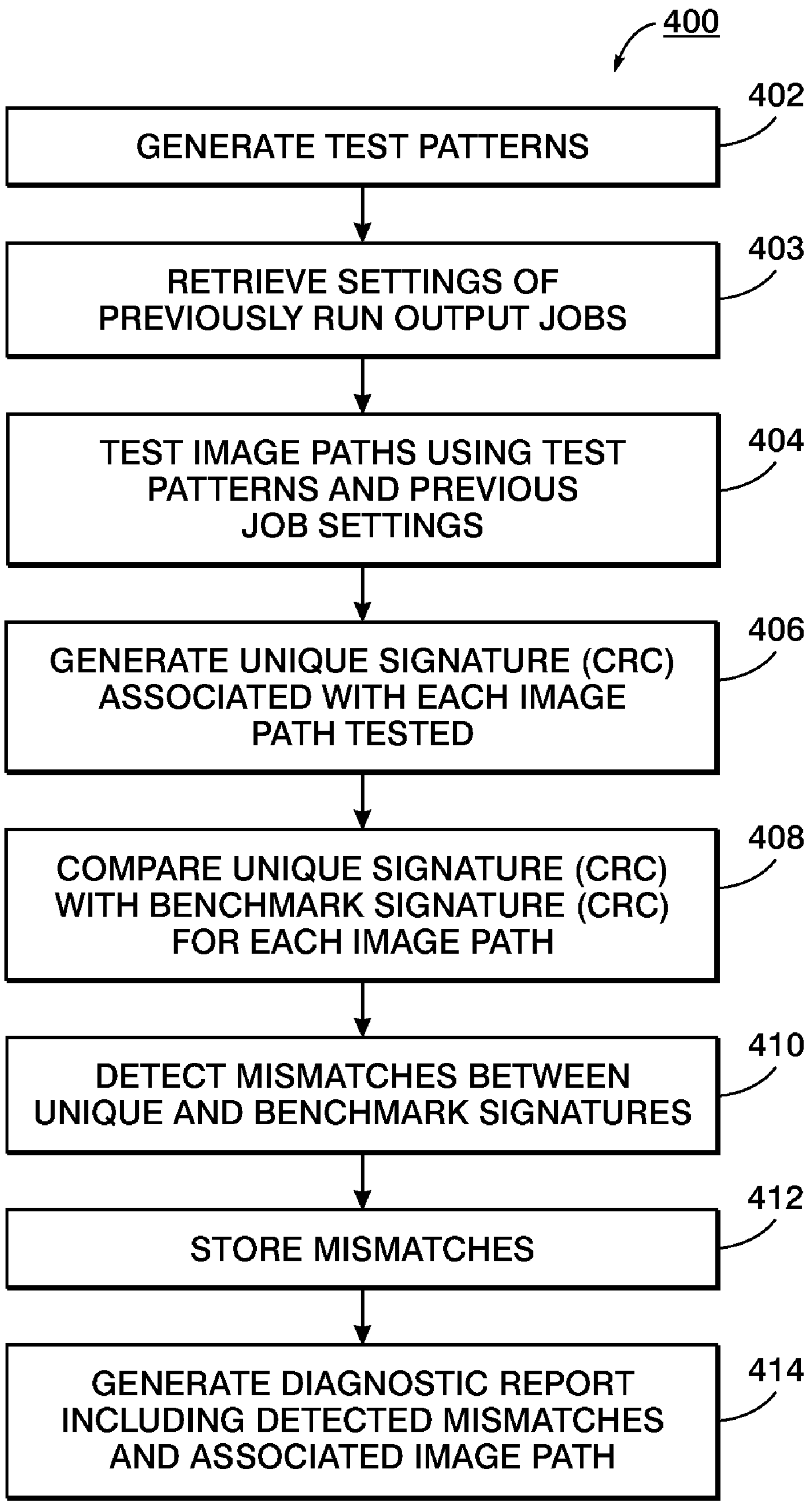
FIG. 4 illustrates a method of testing image paths and generating a diagnostic report associated with at least one problem in the image path for an output job in accordance with an embodiment of the present disclosure.

Furthermore, as will become further evident with the description of FIG. 4, for example, the testing performed on the image path assists in providing the CSE with information regarding the chain of events or job activities that lead to the detected failure condition. The testing also uses information and/or settings associated with previously output jobs to assist in identifying the image paths to be tested.

Figure 3:
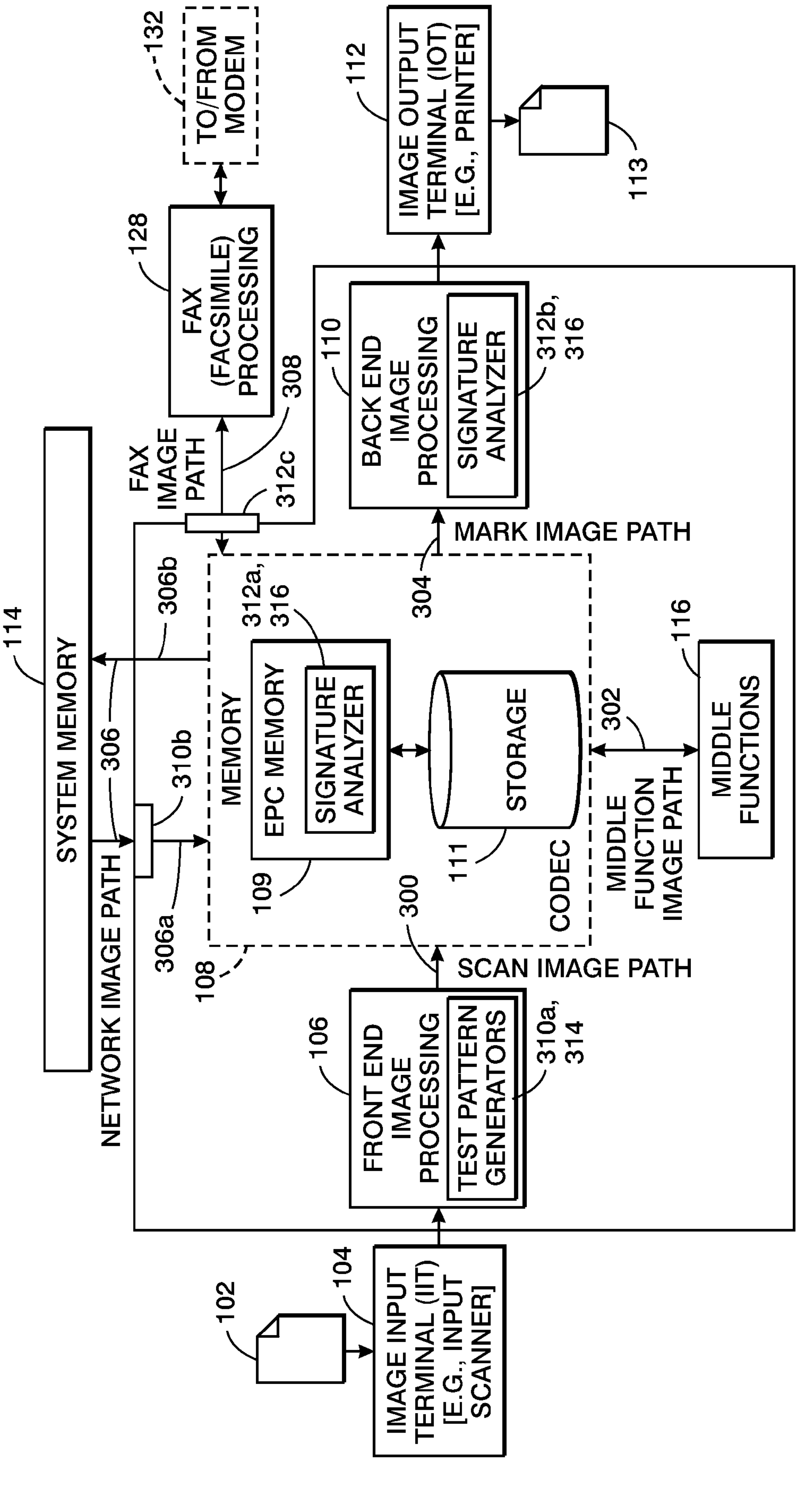
FIG. 3 illustrates a block diagram of an example of a multifunction image path of an image processing apparatus for diagnosing failure conditions in accordance with an embodiment of the present disclosure.

In order to accomplish the set or series of tests through the various image paths of the apparatus, source and sink location 310 and 312, respectively, are provided throughout the image path. As illustrated in FIG. 3, a plurality of source locations 310*a*, 310*b* and sink locations 312*a*, 312*b*, 312*c* are provided in the multifunctional image path 100. The multifunction image paths shown in FIG. 3 illustrate a limited number of paths associated with the processing elements for illustration purposes only, and should not be limiting. That is, it is envisioned that the image paths as shown in FIG. 1 are also provided in FIG. 3, and such image paths (e.g., scan image path 130, print image path 122) are hereby omitted for clarity purposes only. Referring back to FIG. 3, source element 310*a* is associated with front end processing element 106, and source location 310*b* is associated with the system memory 114. However, any number of sources may be provided. A source can be any device that is capable of generating image data and/or simulating image data using test patterns of various sizes and patterns, as noted below. In some embodiments, the source or source location may be integrated or associated with the image processing apparatus, such as an MFP. A source may be one or more of a plurality of different image sources such as a copier, facsimile device, scanner, a computer (local or remote), or any other device that is capable of generating image data. For example, a source may be connected, via a connection device, to transmission devices including, but not limited to, a modem, LAN, WAN, intranet, or Internet.

Sink location 312*a* is associated with EPC memory 109. Sink locations 312*b* is provided at the back end processing element 110, and sink location 312*c* is located at the fax processing element 128. However, any number of sinks may be provided. A sink can be any device that is capable of analyzing processed image data generated by the image processing apparatus. A sink may be able to receive image data output from the image processing device and may store, transmit, or display the image data. For example, a sink may take the form of a network, floppy disk, printer, hard disk, server, computer, fax machine, and the like.

Each of the source locations 310 will have the ability to generate test patterns in each of the color planes at any predefined size. A test pattern (TP) is defined as image data which is designed to provide or assist in evaluating one or more image paths in accordance with associated parameters or settings of the apparatus or system. By using different TPs in each of the color planes and TPs of different sizes, a simulation for different types of output images may be performed.

Each of the sink locations 312 may have a "signature analyzer" 316 (also illustrated as element 518 in FIG. 5) which will essentially run through the image data and have the ability to generate a unique signature based on the results of the analysis. In an embodiment, the signature may be in the form of a unique CRC (Cyclic Redundancy Code). The image data is analyzed to determine if it has been correctly decoded, for example. In some embodiments, the analysis includes using offline simulations of the image path to predetermine a "golden" signature or CRC for each of the test patterns being invoked in the system (and for a given set of parameters being applied to them). "Offline simulations" refer to a period of time wherein the apparatus is configured to determine a golden signature or CRC. An example of such a period of time may be at the time of manufacturing, before the apparatus is distributed (e.g., before assigning the apparatus to a customer location or site). A golden CRC refers to a benchmark or preferred code wherein image data or a job is correctly encoded and decoded without failure or fault in routing the image data through the appropriate image path(s). That is, "golden" CRC or benchmark CRC may refer to a preferred outcome for image data processed in an image path. The term "golden" is used interchangeably with "benchmark" or "preferred" throughout this application and should not be limiting. The golden CRCs may be saved in system memory 114, for example. However, in some embodiments, the golden CRCs may also be saved in memory 108 or storage 111. In some embodiments, the golden CRCs may be temporarily stored in EPC memory 109 for comparison against a unique signature/CRC.

To test and diagnose the image path using test patterns, as further shown and described with respect to FIG. 4, previous output jobs handled by the apparatus are also used. The previous jobs assist in diagnosing the possible source (e.g., a processing element, a particular image path, etc.) of the failure condition, as well as the image paths to be tested. More specifically, the settings associated with previous jobs (i.e., not the current job which caused the one or more detected failure conditions) are retrieved from memory and used with the TPs to test each identified image path. For example, for each job that is output by the apparatus, the settings associated with that job may be temporarily or permanently stored in one or more of memory 108, 114, or storage 111 for later retrieval. In some cases, the apparatus or system may temporarily store a predetermined number of output jobs and their associated settings. Of course, any number of jobs and their settings may be stored and should not be limiting.

Using the signature analyzer 316 of each of the sink locations 312*a*, 312*b*, and 312*c*, the image data run therethrough is encoded by attaching or associating therewith a signature or CRC that is unique to the analyzed image path. An error or discrepancy may then be detected in one or more image paths. More specifically, the unique signature of each image path is compared to the predetermined or benchmark signature, or golden CRC. For example, referring to FIG. 3, for a set of Test Patterns (TP) of varying sizes, one would have the golden signatures or CRCs for each of the possible image paths: e.g., ScanImagePath 300, MarkImagePath 304, FaxImagePath 308, NetworkImagePath 306, and MiddleFunctionImagePath 302. The golden signatures of each of these paths would be used for comparison and diagnosis. ScanImagePath 300 comprises a path including scanning a test pattern, generated by source location 310*a*, through the front end processing element 106 and into EPC Memory 109. MarkImagePath 304 comprises a path including marking a test pattern that is received from EPC memory 109 and directed through back end processing element 110. FaxImagePath 308 comprises a path including processing TP images through fax processing element 128 and saving it to EPC memory 109. NetworkImagePath 306 is represented by image paths for sending 306*b* and receiving 306*a* image data or test patterns. NetworkImagePath 306 is depicted in FIG. 3 as comprising separate paths 306*a* and 306*b* for clarity purposes only, and therefore should not be limiting. NetworkImagePath 306 (306*a*, 306*b*) comprises a path for processing TP images through raster image processing (RIP) (e.g., in the system memory 114), and transfer to EPC memory 109, or, alternatively, transferring TP images from the EPC memory 109 to the system memory 114. MiddleFunctionImagePath 302 comprises a path including performing middle function operations on TP using the middle functions element 116.

FIG. 4 illustrates a method 400 of testing image paths and generating a diagnostic report associated with at least one problem in the image path for a received output job, as referred to above. In the method 400, test patterns are generated, at step 402. In an embodiment, test patterns may be generated at the time of detecting the failure condition, for example. The settings of previously run output jobs are then retrieved, as represented at step 403. The settings may be retrieved from a memory 111, 114, or storage 108, for example. The image paths are then tested using the generated test patterns and previous job settings, at step 404. After testing each image path, at step 406, a unique signature or CRC is generated for each image path. The unique signature is then compared with the predetermined or benchmark signature for each image path, at step 408. At step 410, any mismatches, discrepancies, or errors between the unique and benchmark signatures are detected, and then stored, at step 412. The detected mismatch(es)/discrepancy(ies) and their associated image path are then included when generating the diagnostic report, at step 414.

The generated report (e.g., sent to an operator) may include at least a discrepancy and its associated image path, for example, but should not be limited such elements. For example, it is envisioned that additional information may be provided in or associated with the diagnostic report, such as information related to the machine or apparatus sending the report (e.g., type, brand, model number, etc.). Information related to previous mismatches or discrepancies may also be provided or sent to a remote location, operator, or CSE. Also, it is envisioned that a service record for the device (e.g., a notation including the last time, date, and problem fixed) may also be sent and/or included in a diagnostic report. Nonetheless, it is noted that the information sent in or along with the diagnostic report should not be limiting.

As noted above with respect to step 210 of the method 200, when a failure condition is detected in the system or apparatus, the system performs tests such as those described in FIG. 4 to analyze the set of jobs that were run at the time of the condition, as well as analyze previous jobs that occurred prior to the current job(s). After putting itself into an "unusable" state, as noted in step 206, it would invoke a set of jobs using test patterns and settings of the previous output jobs as noted in step 404 and run through the appropriate image paths. For each of the tests, an image path testing device and signature analyzer, such as represented by elements 516 and 518 in FIG. 5, may generate test patterns to be tested in the image path with the settings of the previous jobs, and then compare the expected golden or benchmark signatures to those of the image paths. If a mismatch occurs or a discrepancy is identified, then the controller will make a note of the jobs that failed. A diagnostic report of the results from the tests performed is then automatically generated and sent to the CSE along with the fault code that invoked the failure condition. The system or apparatus may then be put back into at least a "partially usable" working state, as noted in step 216 of FIG. 2 (e.g., at least one image path identified as having a discrepancy is disabled, while other image paths may be enables or usable).

FIG. 5 illustrates an example of a system 500 including an image processing apparatus 502 for implementing the method of FIG. 2. As shown, the system 500 may include, but should not be limited to, an image processing apparatus 502, a network 524, a service provider 526, a receiving device 528, and a customer or user terminal 530.

The image processing apparatus 502 is generally depicted as comprising an ITT (e.g., scanner) 504, router 506, processing elements section 508, controller 510, system memory 512, and IOT (e.g., printer) 514. Any or each of these devices may comprise similar or equivalent features as noted above with respect to FIGS. 1 and 3. For example, IIT 504 is used to scan or acquire image data. Alternatively, image data may be input into the apparatus 502 through communication with the system memory or outside sources, as described above with respect to FIG. 1. The processing elements section 508 may include, but not be limited to, a front end processing element 106, middle functions element 116, and back end processing element 110. Router 506 may be used to route or direct image data among the image processing elements section 508 based on the selected image path. Router 506 receives instructions regarding the chosen image path for the image data from the controller 510 and selectively routes the image data to the input and output for each processing element in the image processing elements section 508 that is associated with the selected image path. For example, the router 506 may determine, after receiving input from the controller 510, the order or sequence of the image processing elements for which the image data should be directed (e.g., for processing and/or manipulation under the chosen parameters). The router 506 may change the sequence of processing the image data (i.e., the image path) according to the input by the controller 510.

Controller 510 is configured to test the image paths, such as multifunctional image path 100 of FIG. 1, of the processing elements in processing elements section 508 and generate a diagnostic report. Specifically, the controller 510 comprises an image path testing device 516 and a signature analyzer 518 for assisting in generating test patterns and comparing the expected golden signatures to those of the image paths (respectively). The controller 510 may also be used to send or assist in sending the diagnostic report and fault code to a remote receiving device 528.

System memory 512 may be used to store image data. System memory 512 may comprise the system memory 114, memory 109, and/or storage 111 as shown in FIGS. 1 and 3. System memory 512 may be used store image data that is later accessed and retrieved, such as information and settings related to output jobs, or information related to manipulating image data. Converted (e.g., binary to contone image data, contone to binary image data) or compressed image data may also be stored in the system memory 512. System memory 512 may be implemented using static or dynamic RAM, a floppy disk, and disk drive, a writable optical disk and disk drive, a hard disk and disk drive, flash memory, or the like, and may be distributed among separate memory components. System memory 512 may also include read-only memory.

The controller 510 and memory 512 may be used in cooperation with or communicate with IIT 504, one or more processing elements in processing elements section 508, and/or IOT 514 and/or a marking engine interface. An interface 520 and computer unit (CPU) 522 may also be provided in apparatus 502 and in communication with the controller 508 and other system devices. The interface 520 may be a user interface for the customer to input information, adjust settings, and the like, as known in the art. Additionally, when a failure condition occurs, the interface 520 may receive data for displaying a fault code or other information associated with a problem in the apparatus 502. CPU 522 is configured to construct a set of instructions for the controller 510 to transfer information and/or image data between devices of the apparatus 502, or to remote devices. The controller 510 may also be used transmit instructions from the CPU 522 to the processing elements section 508, for example. Additionally, apparatus 502 may be connected to a network 524. CPU 522 may be used to communicate via network 524 with devices such as, but not limited to, fax machines, computers, and other external devices. The controller 510 may communicate with CPU 522 to send out the diagnostic report and fault code to the appropriate destination or address, for example.

Network 524 is representative of any number of networks or systems such as telephone systems that may be used to transmit image data or other information. In some embodiments, the network may be a digital network such as a local area network (LAN), a wide area network (WAN), the Internet or Internet Protocol (IP) network, broadband networks (e.g., PSTN with broadband technology), Voice Over IP, WiFi network, or other networks or systems, or a combination of networks and/or systems, for example, and should not be limited to those mentioned above.

As noted above, digital diagnostic report information may be sent from the apparatus 500 to a receiving device 528 over a network 524. Generally, receiving device 528 may be any device having capabilities to handle and/or send and receive electronic image data (e.g., a computer (PC), personal digital assistant (PDA), cell phone, fax, etc.). In an embodiment, receiving device 528 may comprise a PDA or cell phone, for example. Other machines and devices may also be used as long as they are capable of handling electronic image data. For example, some embodiments may contemplate use with computer based transmission of data (such as "scan to e-mail" transmission). Thus, electronic image data may be sent using a server on a network 524 such as the Internet to send the electronic image data to a recipient with an e-mail address, telephone number, fax number, and the like. The image data may be embedded in an e-mail message, for example, and transferred electronically via a network 524 to a receiving device 528 connected to the network. In an embodiment, the electronic image data may be sent to a file or to a file server or computer storage system (e.g., for archiving, organizing, or retrieval at a later time). In an embodiment, the receiving device 528 may be used to send the image data file or information to another device such as a fax, for example. Generally, any number of devices may be used for receiving the report and fault code information via network 524.

In some embodiments, MFP or the image processing apparatus 502 may send (e.g., via CPU 522) the report and fault code and/or image data file to the service provider 526 at a remote location via network 524. For example, the data may be sent to a PC device or fax machine at the service provider's location. In some embodiments, the apparatus 502 may send the report, fault code, and/or other image data to a customer or user terminal 530. The customer or user terminal 530 may be provided on or near a similar location as the apparatus 530. Additionally or alternatively, the terminal 530 may be provided at a remote location. Nonetheless, the customer or user terminal 530 is connected to network 524 to receive and/or exchange communication with the apparatus 502. For example, it may be advantageous that the generated diagnostic report and fault code is sent to one or more service personnel or administrator(s) associated with the customer. Generally, the number of recipients designed to receive the generated diagnostic report, fault code, and/or other image data or information should not be limited to those described herein. For example, any number of recipients may be connected to network 524.

The methods and system described herein are beneficial for reducing service costs to both the customer and service provider. Additionally, the system 500 is capable of internally diagnosing (i.e., without the need for user intervention by a CSE or operator) problems or failures in the multifunctional image path. Thus, MFDs or image processing apparatuses are capable in at least assisting in identifying and solving image path related problems. Also, the use of the information and settings related to previously run output jobs of the apparatus information becomes is useful for identifying the image data paths to test with the test patterns. Furthermore, the methods of diagnosis as described herein do not require hard copies or additional prints for determining the failure condition.

Though a multifunction image path 100 and apparatus 502 are generally discussed as being a part of a MFD, it should be noted that the above steps as described in method 200 and/or 400 may be applied to any type of output device, including, but not limited to, copying, printing, displaying, and xerographic devices.

Other embodiments include incorporating the above steps into a set of computer executable instructions readable by a computer and stored on a data carrier or otherwise a computer readable medium, such that the method 200 and/or 400 are automated. FIGS. 2 and 4 show flow charts of such computer readable instructions. For example, in some embodiments, memory or storage of an output device carrying computer readable instructions is configured such that when the computer readable instructions are executed by a computer, they cause a computer to automatically perform a method for diagnosing a failure condition of an image processing apparatus when outputting documents.

While the principles of the disclosure have been made clear in the illustrative embodiments set forth above, it will be apparent to those skilled in the art that various modifications may be made to the structure, arrangement, proportion, elements, materials, and components used in the practice of the disclosure.

It will thus be seen that this disclosure has been fully and effectively accomplished. It will be realized, however, that the foregoing preferred specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. A method for diagnosing a failure condition of an image processing apparatus, the image processing apparatus including an image input terminal for inputting documents into image data and an image output terminal for outputting documents, the method comprising:

receiving an output job comprising image data of a document to output using the image processing apparatus;

detecting a failure condition in at least one of a plurality of image paths of the image processing apparatus;

issuing a fault code based on the detected failure condition;

retrieving information related to previous output jobs output by the image processing apparatus, the retrieved information identifying at least a number of image paths to be tested and settings associated with each previous output job;

performing a plurality of tests on the identified number of image paths of the image processing apparatus using the retrieved information, the plurality of tests including:

comparing, for each identified image path, a benchmark outcome of image data processed therein to an actual outcome for the received image data processed therein, and determining at least one image path of the identified number of image paths having a discrepancy as a result of the comparing of the benchmark and actual outcomes; and, generating a diagnostic report based upon the at least one determined image path.

2. The method according to claim 1, further comprising sending at least the generated diagnostic report and issued fault code to an operator at a remote location.

3. The method according to claim 1, wherein detecting the failure condition sets the image processing apparatus into a temporary unusable mode preventing the image processing apparatus from outputting documents.

4. The method according to claim 1, wherein the detecting of the failure condition and issuing of the fault code are performed by a controller of the image processing apparatus.

5. The method according to claim 1, wherein the method further comprises generating test patterns to test the identified number of image paths of the image processing apparatus.

6. The method according to claim 1, wherein the method further comprises disabling the at least one image path determined to have a discrepancy.

7. An image processing apparatus comprising:

an input device for inputting image data of a document to be output;

an output device for outputting the image data;

a plurality of image processing elements for processing the image data, each of the image processing elements comprising an input and an output;

a router configured to route the image data among the plurality of image processing elements via an image path selected from a plurality of image paths, each image path being a series of connections between the inputs and outputs of the processing elements;

a controller for detecting a failure condition in at least one of the plurality of image paths and outputting a fault code based on the detected failure condition;

the controller configured to retrieve information related to previous output jobs output by the image processing apparatus, the retrieved information identifying at least a number of image paths to be tested and settings associated with each previous output job;

the controller configured to perform a plurality of tests on the identified number of image paths of the image processing apparatus, the controller comprising a comparison tool configured to perform the plurality of tests, the plurality of tests at least identifying a discrepancy in an image path determined by comparing a benchmark outcome of image data input into each image path with an actual outcome of the image data input into each image path, and wherein the controller is configured to generate a diagnostic report based upon the results of the plurality of tests.

8. The apparatus according to claim 7, wherein the image processing apparatus is connected to a network, and wherein the controller sends at least the generated diagnostic report and issued fault code to an operator at a remote location via the network.

9. The apparatus according to claim 7, wherein the generated diagnostic report includes at least the identified discrepancy and its associated image path.

10. The apparatus according to claim 7, wherein the controller further comprises an image path testing device for generating test patterns, and wherein the identified number of image paths are tested using the generated test patterns and the retrieved information.

11. The apparatus according to claim 7, wherein the controller is configured to disable the at least one image path identified to have a discrepancy.

12. A computer readable medium having stored computer executable instructions, wherein the computer executable instructions, when executed by a computer, directs a computer to perform a method for diagnosing a failure condition of an image processing apparatus, the method comprising:

receiving an output job comprising image data of a document to output using the image processing apparatus;

detecting a failure condition in at least one of a plurality of image paths of the image processing apparatus;

issuing a fault code based on the detected failure condition;

performing a plurality of tests on the plurality of image paths of the image processing apparatus, the plurality of tests including:

comparing, for each image path, a benchmark outcome of image data processed therein to an actual outcome for the received image data processed therein, and identifying at least one image path of the plurality of image paths having a discrepancy as a result of the comparing of the benchmark and actual outcomes; and, generating a diagnostic report based upon the results of the plurality of tests.

13. The computer readable medium according to claim 12, the method further comprising sending at least the generated diagnostic report and issued fault code to an operator at a remote location.

14. The computer readable medium according to claim 12, wherein performing a plurality of tests includes analyzing the image path of the received output job at the point of failure condition.

* * * * *